(12) United States Patent
Naor et al.

(10) Patent No.: US 6,236,861 B1
(45) Date of Patent: May 22, 2001

(54) METHOD FOR TRACKING MOBILE USERS IN A CELLULAR NETWORK

(75) Inventors: Zohar Naor; Hanoch Levy, both of Tel Aviv (IL)

(73) Assignee: Ramot University Authority for Applied Research and Development Ltd., Tel Aviv (IL)

(*) Notice: Subject to any disclaimer, the term of this patent is extended or adjusted under 35 U.S.C. 154(b) by 0 days.

(21) Appl. No.: 09/126,381

(22) Filed: Jul. 30, 1998

(51) Int. Cl.$^7$ .............................. H04Q 7/20; H04M 11/00
(52) U.S. Cl. ..................... 455/458; 455/456; 455/434; 455/435
(58) Field of Search .................................. 455/434, 435, 455/458, 456

(56) References Cited

U.S. PATENT DOCUMENTS

| | | | |
|---|---|---|---|
| 5,305,466 | * 4/1994 | Taketsugu | 455/435 |
| 5,369,681 | * 11/1994 | Boudreau et al. | 455/456 |
| 5,590,395 | * 12/1996 | Diekelman | 455/13.1 |
| 5,642,398 | * 6/1997 | Tiedemann, Jr. et al. | 455/426 |
| 5,946,618 | * 8/1999 | Agre et al. | 455/428 |
| 6,035,203 | * 3/2000 | Hanson | 455/458 |

OTHER PUBLICATIONS

Naor Z. et al., "Minimizing the Wireless Cost of Tracking Mobile Users: An Adaptive Threshold Scheme", *IEEE Infocom'98* pp. 720–727.

Levy H. and Naor Z., "Initiated Queries and their Application for Tracking Users in Wireless Networks", *Sixth WIN-LAB Workshop*, 1997, pp. 381–399.

Akyildiz, I. F., J. S. M. Ho and Y. B. Lin, "Movement Based Location Update and Selective Paging Schemes", *IEEE/ACM Trans. on Networking*, vol. 4, No. 4, pp. 629–638 (1996).

Madhow U., L. Honig and K. Steiglitz, "Optimization of Wireless Resources for Personal Communications Mobility Tracking", *IEEE Trans. on Networking*, vol. 3, No. 6, pp. 698–707 (1995).

Bar–Noy A., I. Kessler and M. Sidi, "Mobile Users: to Update or not to Update?", *Wireless Networks*, vol. 1, No. 2, pp. 175–185 (1995).

Rose C., "Minimizing the Average Cost of Paging and Registration: A Timer–Based Method", *ACM Journal of Wireless Networks*, vol. 2, No. 2, pp. 109–116 (1996).

* cited by examiner

*Primary Examiner*—Daniel Hunter
*Assistant Examiner*—Alan T. Gantt
(74) *Attorney, Agent, or Firm*—Mark M. Friedman

(57) ABSTRACT

A method for tracking users of a cellular communications network in which the network pages users according to registration messages received from the users. Within each location area of the network, the cells are assigned identities. The cells broadcast codes representative of those identities to the users. In a first preferred embodiment, the identities facilitate the computation, by the users, of distance traveled. Each user transmits a registration message only after traveling a certain distance. In a second preferred embodiment, neighboring cells have different identities. Each user transmits a registration message only after exceeding a threshold number of transits from one cell to another. In a third preferred embodiment, each cell is assigned a unique identity. Each user transmits registration messages periodically, but only if the cell in which the user is located has changed since the last registration transmission.

19 Claims, 2 Drawing Sheets

METHOD FOR TRACKING MOBILE USERS IN A CELLULAR NETWORK

FIELD AND BACKGROUND OF THE INVENTION

The present invention relates to cellular communications and, more particularly, to a method for tracking mobile users in a cellular network.

The increasing demand for personal communication services (PCS) requires wireless networks to gracefully accommodate mobility of both users and services. Contrary to wired networks, in which user location is fixed, in wireless networks a user can potentially be located anywhere within the system service area. As the number of mobile users keeps increasing, the amount of signaling traffic required for location management keeps growing. The cost associated with the need to locate a mobile user is composed of two parts: 1) The cost of accessing data bases, such as Home Location Register (HLR) and Visitor Location Register (VLR), and 2) The cost of radio signaling over the control channel.

The problem of tracking mobile users has been addressed by several studies, many of which attempt to reduce the wireless cost of user tracking. In Rose C., "Minimizing the Average Cost of Paging and Registration: A Timer-Based Method", *ACM Journal of Wireless Networks*, Vol. 2, No. 2, pp. 109–116 (1996), a timer based method was suggested in which the user updates its location every T time units, where T is a time threshold. Each time the user makes no contact with the network for T units of time, the user initiates a registration message. Another strategy, suggested in Bar-Noy A., I. Kessler and M. Sidi, "Mobile Users: to Update or not to Update?", *Wireless Networks*, Vol. 1, No. 2, pp. 175–185 (1995), and in Madhow U., L. Honig and K. Steiglitz, "Optimization of Wireless Resources for Personal Communications Mobility Tracking", *IEEE Trans. on Networking*, Vol. 3, No. 6, pp. 698–707 (1995), is to use a distance-based method in which the user tracks the distance it moved from its last known location, in terms of cells. Whenever this distance exceeds a parameter D the user transmits a registration message. The distance-based strategy is considered as the most efficient tracking strategy, however its implementation is the most difficult. In Bar-Noy et al. (1995), and in Akyildiz, I. F., J. S. M. Ho and Y. B. Lin, "Movement Based Location Update and Selective Paging Schemes", *IEEE/ACM Trans. on Networking*, Vol. 4, No. 4, pp. 629–638 (1996), a movement based method was suggested, in which the user counts the number of cell transitions, and transmits a registration message whenever this number exceeds a pre-defined threshold. A load-sensitive approach, in which the tracking activity adapts to both user and system activity was suggested in Levy H. and Naor Z., "Initiated Queries and their Application for Tracking Users in Wireless Networks", *Sixth WINLAB Workshop*, 1997, pp. 381–399, and in Naor Z. and Levy H., "Minimizing the Wireless Cost of Tracking Mobile Users: An Adaptive Threshold Scheme", *IEEE INFOCOM'98* pp. 720–727. The basic assumption underlying all these methods is that the user location, as well as other derived parameters (such as the distance traveled from its last known location), are always known to the user. However, in reality, this information is not available to the user.

Existing cellular systems use the following tracking strategy, known as the geographic-based (GB) strategy: The geographic area is partitioned into location areas, based on the commercial licenses granted to the operating companies. A location area (LA) is a group of cells, referred to as a home-system. The term location area is used by GSM systems, while IS-41 refers to the LA as registration area. Users register whenever they change LA, while within the LA they never register. The implementation of the geographic-based (GB) strategy is very simple: All base stations within the same LA periodically broadcast a location area code wherein is encoded the ID of the LA. Each user receives the location area code of the LA wherein it is located, compares its last LA ID with the current ID, and transmits a registration message whenever the ID changes. Hence, the user is not aware of its exact location within the LA. When there is an incoming call directed to a user, all the cells within its current LA are paged. Because the number of cells within a typical LA is very large, the tracking cost associated with the GB strategy is very high.

There is thus a widely recognized need for, and it would be highly advantageous to have, a method for tracking users of a cellular communications network that is based on user location measured at the cell level.

SUMMARY OF THE INVENTION

According to the present invention there is provided, in a system, including at least one location area, each of the at least one location area including a plurality of cells, each cell having a certain size, wherein at least one user moves among the cells of the at least one location area, and wherein, for each cell, a location area code, representative of the location area wherein the each cell is included, is transmitted to each of the at least one user located within the each cell, a method for tracking the at least one user, including the steps of: (a) assigning a cell identity to each cell; (b) for each cell, broadcasting a cell code representative of the cell identity of the each cell to each of the at least one user located within the each cell; (c) for each at least one user, receiving both the location area code and the cell code transmitted for the each cell wherein the each at least one user is located; and (d) for each at least one user, transmitting a registration message, the transmitting being based both on the location area code received by the at least one user and on the cell code received by the each at least one user.

The present invention is based on a new approach for providing the users with location information, or other related information, necessary to reduce the tracking cost. The basic idea is to assign an identity to each cell that identifies the cell and its orientation relative to the other cells, and to encode that identity in a Cell Identification Code (CIC). It is important to note that this cell identity is not necessarily unique. In fact, in two of the three preferred embodiments of the present invention that are presented below, the cell identity is not unique. Each cell periodically broadcasts its identification code through the down link control channel (DCCH in GSM systems). The goal of the CIC is to provide the location information required to the users, in order to perform the registration strategy. The users then base the frequency with which the registration messages are broadcast on the CICs that they have received.

Three preferred CIC encoding schemes are presented below: The first, achieving the best performance, is the basis of an embodiment of the present invention that implements a distance-based tracking strategy. For a realistic two dimensional topology, a four bit message is sufficient to provide a reliable distance-based tracking. The second preferred embodiment of the present invention is based on a combined timer and movement tracking strategy, based on either a one-bit or a two-bit CIC, depending on system topology and user mobility. A movement based tracking strategy is a special case of the combined timer and movement tracking strategy. The third preferred embodiment of the present invention is a conditional timer strategy, in which the user examines its current location every T time units, using a CIC, and if the current location differs from the last known location, the user transmits a registration message.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method for tracking users of cellular communications networks.

The principles and operation of cellular communications according to the present invention may be better understood with reference to the drawings and the accompanying description.

Below are described several cell identification encoding schemes which support different tracking strategies, and the associated wireless cost of their implementation. Each cell is assigned a (not necessarily unique) code, which identifies the orientation of that cell relative to other cells within the same LA.

Consider a wireless network partitioned into cells. The user location is understood as the cell in which the user is currently residing. Two cells are called neighboring if a user can move from one to another without crossing any other cell.

The idea of distance-based tracking strategy was first suggested in Bar-Noy et al. (1995) and in Madhow et al. (1995), and it is considered as the most efficient tracking strategy. The basic idea is that whenever the distance, measured in cells, between a user's last known location and that user's current location exceeds a threshold distance, say D, the user registers. Hence, in order to implement the distance-based strategy, the user must be able to calculate the distance between the user's current location and the user's last known location. However, the implementation issue of this strategy has not been addressed heretofore. Unfortunately, the required location information is not generally available to the user. For this reason, this strategy is not supported by existing cellular networks. The distance between any pair of cells, in terms of number of cells, depends in general on the system topology. It is assumed herein that the system topology is the following: The network is partitioned into location areas. Each location area LA is a group of two dimensional cells. The system coverage area is assumed to be a continuous area, containing no "holes". That is, given any two cells, say x and y, the shortest path between x and y is completely contained within the system. These assumptions hold in practice for most wireless networks. Under these assumptions, a four-bit CIC is sufficient to support a distance-based tracking.

The cell identification code of the distance based strategy, CIC-distance, or CIC-D in short, is as follows: A uniform grid of tiles is superposed on the plane. The identity of any tile on the grid is the Cartesian product of the indices of the horizontal and vertical bands within which the tile lies. The bands are indexed using a modulo-3 increasing sequence, in a pre-defined direction (for example: East-West and North-South).

Figure 1:
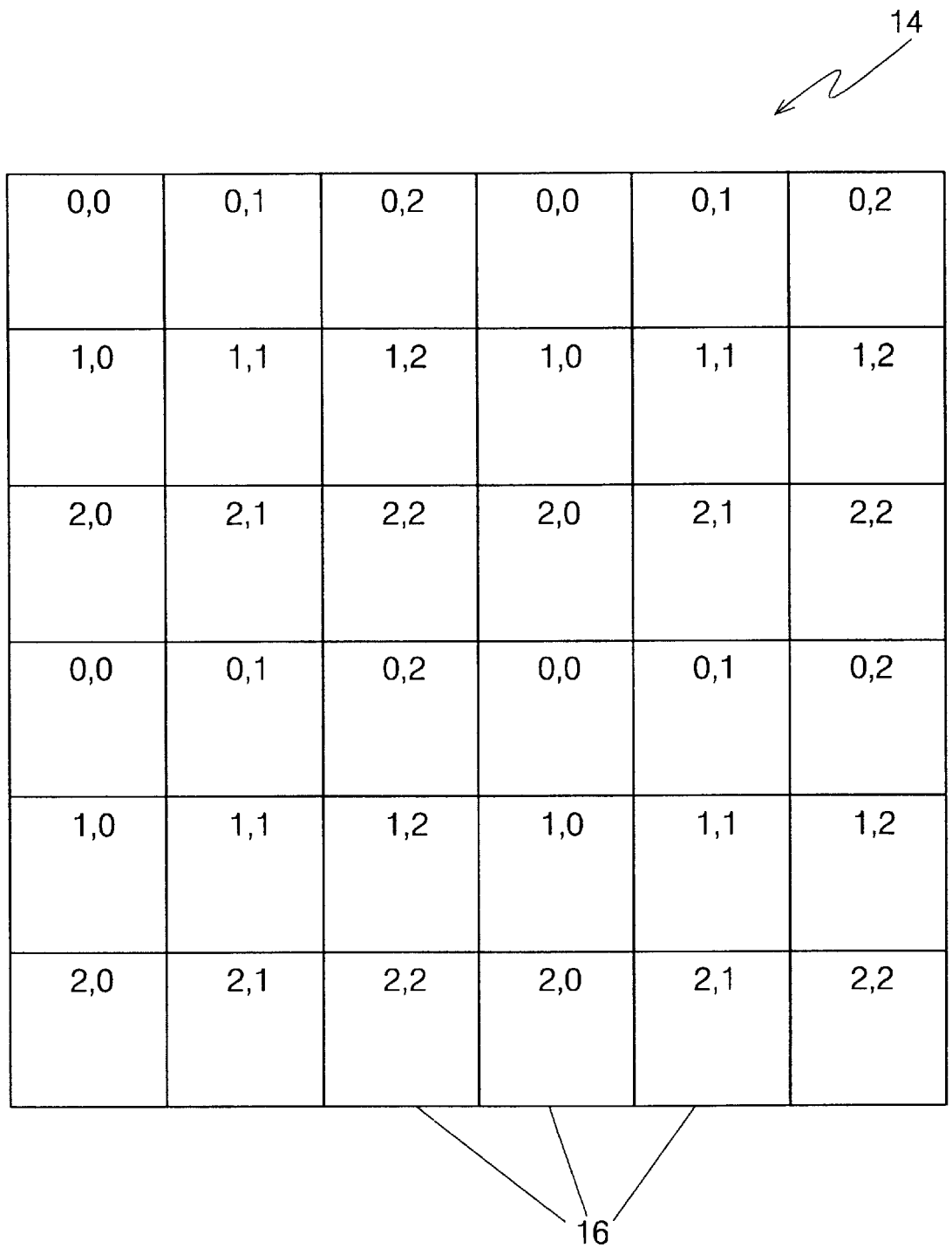
FIG. 1 shows a grid of tiles.
Figure 2:
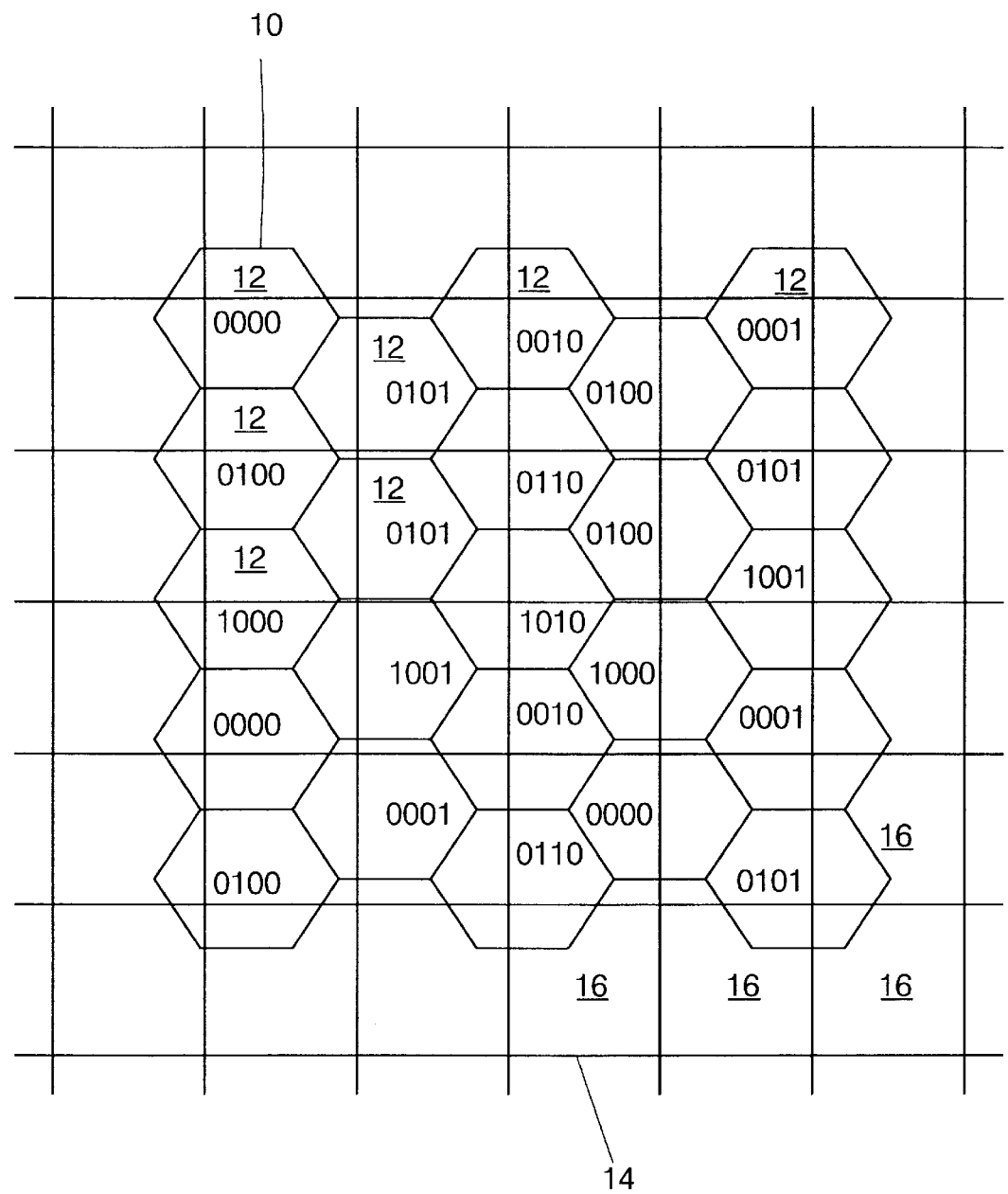
FIG. 2 shows the grid of FIG. 1 superposed on a group of hexagonal cells.

Referring now to the drawings, FIG. 1 shows a grid 14 of tiles, some of which tiles are labeled by the reference numeral 16. Tiles 16 are indexed by a pair of integers, the first integer being a modulo 3 vertical (north-south) coordinate and the second integer being a modulo 3 horizontal (east-west) coordinate. FIG. 2 shows grid 14 superposed on a group 10 of hexagonal cells, some of which cells are labeled by the reference numeral 12. Along each dimension a cell 12 is identified by the band on which that cell 12 lies. If a cell 12 lies on more than one band, then that cell 12 is identified by the first of these bands along the pre-defined direction mentioned above. For example, the vertical cell code is determined by the northernmost tile 16 in which that cell 12 is contained. Cells 12 in FIG. 2 are labeled by their binary CICs according to this indexing scheme. When a paging event occurs, the search is conducted first at the user last reported cell 12. If the user is not found there, then the search is conducted simultaneously at all cells 12 contained in the same tile 16 as the last reported cell 12. If the user is not found in the last reported tile 16, then the search is conducted in increasing distance order from this tile 16, until the user is found. The number of tiles 16 being paged simultaneously depends on the paging delay constraint. For a two dimensional system the CIC-D length is four bits, two for each dimension. In general, the CIC-D length is 2D bits for a D-dimensional system.

Lemma 1: Let l(t) be the user location at time t. Let l(0) be the user last known location, at time t=0. Then, for a grid topology system, in which all cells are squares of equal size, using CIC-D, the distance from l(t) to l(0) can be computed for any time t>0.

Proof: The proof results from the fact that a modulo-3 increasing indexing uniquely identifies the direction of motion along each dimension. For example, if the index increases from west to east and the indices used are 0,1,2, then the transitions 0→1, 1→2 and 2→0 reflect eastward movements, while the transitions 1→0, 2→1 and 0→2 reflect westward movements. Thus, moving from any cell to anyone of its eight nearest neighbors, the use of the CIC-D code along both horizontal and vertical dimensions allows precise tracing of the distance traveled, measured in tiles.

Lemma 2: Let l be the tile length of a uniform grid placed on a two dimensional system. Let x be the maximal length of a cell within the system, in either dimension. l represents the size of the tile. x represents the size of the cell. A sufficient condition to determine the tile location of a user by tracing the CIC-D indices on the grid, is that $x \geq l$. A necessary condition to guarantee that tracing the CIC-D indices can properly determine the tile location of the user is that $x \geq 2l$.

Proof: If $x \geq l$ then any cell within the system can be contained in at most two tiles. If a cell is contained in two adjacent tiles, its CIC-D index is derived from the leftmost tile in which it contained, for each dimension. Hence, moving in or out such a cell may change each CIC-D index by at most one. Hence, a user crossing more than one tile must also cross the border between two cells, having indices differing by at most one. Using Lemma 1, that means that every cell boundary crossing have a unique interpretation of the motion direction. Hence, the distance, measured in tiles, can be derived from tracing the CIC-D indices along the user trajectory, with a precision of one tile. If $x > 2l$ there must exist a cell, say a, which contained in at least 3 tiles. Without loss of generality, let us denote the CIC-D indices of these three tiles by 0, 1, 2 from east to west, respectively. Traveling through a, the user may detect a CIC-D index transition 0→2 either by moving two tiles westwards, to the nearest neighbor of a from the west, or by moving one tile eastwards, to the nearest neighbor of a from the east. Hence, tracing the CIC-D indices can not properly determine the tile location of the user.

The distance d between locations (x,y) and (x+Δx,y+Δy) can be derived by one of three alternative metrics:

The Euclidean metric: $d_E=\sqrt{\Delta x^2+\Delta y^2}$.

The city block metric, also known as the Manhattan metric: $d_c=|\Delta x|+|\Delta y|$.

The maximum value metric, also known as the chessboard metric: $d_M=\max\{|\Delta x|,|\Delta y|\}$.

Note that under all three metrics, the distance value is uniquely defined as a function of $|\Delta x|$ and $|\Delta y|$.

The second preferred embodiment of the present invention is based on the movement based strategy. Under this strategy, the user counts the number of cell transitions, and transmits a registration message whenever this number exceeds a pre-defined cell transit number threshold. In order to detect a cell boundary crossing, it is sufficient to assign each cell a different CIC from its nearest neighbors. Hence, this is a special case of the graph coloring problem: Given a wireless networks, its adjacency graph is defined as an undirected graph in which each cell is represented by a vertex, and there is an edge connecting two vertices if and only if these vertices represent neighboring cells. The problem of implementing the movement based strategy using CIC is therefore the problem of finding the smallest number of colors needed such that every vertex in the equivalent adjacency graph is assigned one color, and no two vertices connected by an edge get the same color. For a general planar graph, at most four colors are required to detect a cell boundary crossing. Hence, for a wireless network whose adjacency graph is a planar graph, at most four different codes are required to implement the movements-based strategy. For simpler topologies even fewer codes may suffice. For example, in the hexagonal system of FIG. 1, only three colors are required. For a two dimensional chessboard topology, if only cells having a common border are defined as neighboring cells, where a cell boundary crossing is allowed only in horizontal or vertical direction, then only two codes are required.

Note that an alternative approach for detecting a cell boundary crossing is the identification of a drop in the radio signal power. However, such a drop can often occur inside a cell, for example as a result of radio propagation interference. Using a CIC for detecting a cell boundary crossing is therefore more reliable.

A more general variant of the second preferred embodiment of the present invention is the timer/movement (TM) strategy, which combines a timer with a movement counter, as follows:

1. A user counts the number of cell transitions since the user's last location update.

2. Every T time units the user checks the number of cell transitions k since the user's last location update.

3. If k exceeds a pre-defined cell transit number threshold M, the user transmits a registration message and the movement counter is set to zero.

4. Otherwise, the user does not register. Future cell transitions will accumulate at k, and the movement counter will be checked again after additional T time units.

Note that this strategy guarantees the registration rate to be bounded from above by 1/T. The movement based strategy is a special case of the TM strategy, with a timer equal to one time unit.

The timer-based method of Rose (1996) is the simplest tracking strategy to implement, because the user is not required to process any location information. However, as is shown below, the performance of the timer-based method can be significantly improved by using location information. To illustrate this idea, consider the third preferred embodiment of the present invention, a conditional timer (CT) method: A user transmits a registration message every T time units, provided that the user's present location differs from the user's last known location. Clearly, the paging cost under the CT strategy is identical to that of the simple timer-based method. However, the registration cost of the CT strategy is lower than that of the timer-based method, because unnecessary registration messages are avoided. Hence, the CT strategy outperforms the timer based method whenever the expected reduction in registration cost exceeds the CIC transmission cost. Note that the CT strategy is independent of the system topology.

To compare the performance of the CT strategy to that of the timer-based strategy, consider an LA consisting of N cells and n users, and let T be the time threshold used. Under the CT strategy, a user examines its current location every T time units, and if the new location differs from the last known location, the user transmits a registration message. Let l(t) be the user location at time t. If the last registration message was transmitted at time t=0, then the condition for the next registration message is that l(T)≠l(0). Assuming that user motion is Markovian and location independent, let P(T) be the probability that a user will remain at its location after time t=T, namely: $P(T)=Pr[l(t-T)=l(t)]$. Let $l_r$ be the cost of registration, measured in number of bits. Comparing to the timer-based method, the registration cost rate under the CT method is reduced by:

$$\Delta_r = nl_r\left[\frac{1}{T} - \frac{1-P(T)}{T}\right] = \frac{nP(T)l_r}{T}$$

Let $T_1$ be the time period between two successive CIC messages under the CT strategy, CIC-CT in short. Since a CIC-CT message uniquely identifies each cell, the length of the message must be equal to $\log_2 N$, and the CIC transmission cost is given by:

$$T_{CT} = \frac{N\log_2 N}{T_1}$$

The use of CIC-CT can reduce the tracking cost whenever $\Delta_r > T_{CT}$. Hence, the condition under which the CT strategy outperforms the timer strategy is:

$$P(T) > \frac{\log_2 N}{l_r}\left(\frac{T}{T_1}\right)\frac{1}{\rho}$$

where $\rho=n/N$ is the number of users per cell. For example, in the GSM system the minimal cost of registration is 55 bytes (Meier-Hellstern, K. S. and E. Alonso, "The Use of SS7 and GSM to Support High Density Personal Communications", *Wireless Communication*, pp. 55–68, Kluwer, 1993). Hence, for a system with user density $\rho=1200$ users per cell, N=128 cells, T=10 minutes, and $T_1=1$ second, it follows that for P(T)>0.008 the CT strategy outperforms the timer based strategy.

The implementation of the CT strategy is very simple, and independent of the system topology: A unique code is assigned to each cell. The CIC-CT indexing also supports location-dependent tracking strategies. For example, each user can store in its memory the CIC of the cells where its home, office, and other places where the user remains for extended periods of time are located. The user does not transmit a registration message when the user is located in these "high residence time" cells, and the network always pages the user in these cells. The remaining cells are referred to herein as "low residence time cells".

The performance of the preferred embodiments of the present invention are compared to the timer based method in the Appendix.

While the invention has been described with respect to a limited number of embodiments, it will be appreciated that many variations, modifications and other applications of the invention may be made.

Appendix: Performance Analysis, Comparison of the Strategies, Numerical Results

Let $d_x, d_y$ be the distance traveled from the user last known location along the horizontal and vertical direction, respectively. The distance $d$ from the user last known location is given by $d = d_x + d_y$. Each layer $l(d)$ is partitioned into two disjoint groups: The group $l_1(d)$ is the collection off all locations satisfying: $d_x + d_y = d$, $d_x \neq 0$, $d_y \neq 0$. While the group $l_2(d)$ is the collection of all locations satisfying: $d_x + d_y = d$, where either $d_x = 0$, or $d_y = 0$. Note that for $1 \leq d \leq D - 1$, there are exactly 4 locations in $l_2(d)$, and $4(d-1)$ locations in $l_1(d)$. Since $\lambda$ is the probability of a call arrival, a user located at $l(d)$ can move to the layer $l(0)$ with probability $\lambda$. A user located at $l_1(d)$ ($0 < d < D - 1$) can either move to the layer $l(d-1)$ with probability $(1-\lambda)2p$, move to the layer $l(d+1)$ with probability $(1-\lambda)2p$, or remain at its current location with probability $(1-\lambda)(1-4p)$. A user located at $l_2(d)$ ($0 < d < D - 1$), can either move to the layer $l(d-1)$ with probability $(1-\lambda)p$, move to the layer $l(d+1)$ with probability $(1-\lambda)3p$, or remain at its current location with probability $(1-\lambda)(1-4p)$. The distance traveled by the user from its last known location is described by a Markov chain, in which the state is defined by $(d_x, d_y)$, where $d_x + d_y < D$. Whenever $d_x + d_y = D$ the user transmits a registration message and immediately reaches the state $(0,0)$.

Let $S(d_x, d_y)$ denotes the steady state probability to find the user at state $(d_x, d_y)$. The equilibrium equations for the Markov chain are given by:

$$[4p(1-\lambda) + \lambda]S(0,0) = \lambda + p(1-\lambda)\left[\sum_{l(1)} S(d_x, d_y) + 2 \sum_{l_1(D-1)} S(d_x, d_y) + 3 \sum_{l_2(D-1)} S(d_x, d_y)\right]. \quad (6)$$

For $(d_x, d_y) \in l_1(d)$, $D - 1 > d > 0$:

$$[4p(1-\lambda) + \lambda]S(d_x, d_y) = (1-\lambda)pS'(d_x, d_y), \quad (7)$$

where $S'(d_x, d_y) = S(d_x - 1, d_y) + S(d_x + 1, d_y) + S(d_x, d_y - 1) + S(d_x, d_y + 1)$.

For $(d_x, d_y) \in l_2(d)$, $D - 1 > d > 0$:

$$[4p(1-\lambda) + \lambda]S(d_x, d_y) = (1-\lambda)pS''(d_x, d_y), \quad (8)$$

where $S''(0, d_y) = S(0, d_y + 1) + S(0, d_y - 1) + 2S(1, d_y)$, and similarly, for $d_y = 0$:
$S''(d_x, 0) = S(d_x - 1, 0) + S(d_x + 1, 0) + 2S(d_x, 1)$.

For $d = D - 1$, $(d_x, d_y) \in l_1(D-1)$:

$$[4p(1-\lambda) + \lambda]S(d_x, d_y) = (1-\lambda)p[S(d_x - 1, d_y) + S(d_x, d_y - 1)]. \quad (9)$$

For $d = D - 1$, $(d_x, d_y) \in l_2(D - 1)$:

$$[4p(1 - \lambda) + \lambda]S(0, D - 1) = (1 - \lambda)pS(0, D - 2)]. \tag{10}$$

$$[4p(1 - \lambda) + \lambda]S(D - 1, 0) = (1 - \lambda)pS(D - 2, 0)]. \tag{11}$$

The steady state probabilities can be obtained using standard numerical procedures for solving Equations 6-11. Figure 2 depicts the steady state probabilities for $D = 10$ and $D = 20$, as computed numerically for $\lambda = 0$.

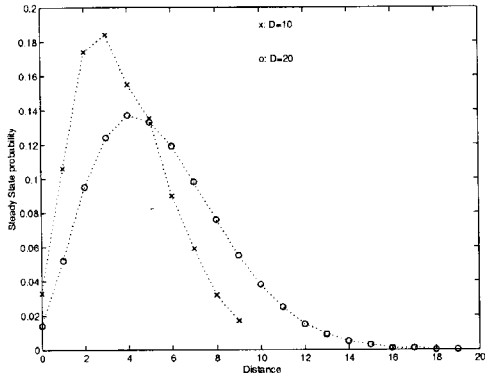

Figure 2: Distance based strategy: Steady state probabilities for $\lambda = 0$.

Let $\pi_d$ denotes the probability that under steady state the user is at a distance $d$ from its last known location. Let $\pi_d^1$, $\pi_d^2$ be the steady state probabilities to be in $l_1(d)$, $l_2(d)$, respectively. The expected paging cost is given by:

$$P_D = \sum_{d=0}^{D-1}[1 + 2d(d+1)]\pi_d l_p = [1 + \sum_{d=1}^{D-1} 2d(d+1)\pi_d]l_p, \tag{12}$$

where $l_p$ is the cost of a single paging, measured in number of bits. A registration message is transmitted whenever a user located in a distance $D - 1$ from its last known location moves to location in a distance $D$ from its last known location. That happens with probability $2p$ if the user location belong to $l_1(D - 1)$, and with probability $3p$ if it belong to $l_2(D - 1)$. The expected registration cost is therefore:

$$R_D = [2p\pi_{D-1}^1 + 3p\pi_{D-1}^2]l_r, \tag{13}$$

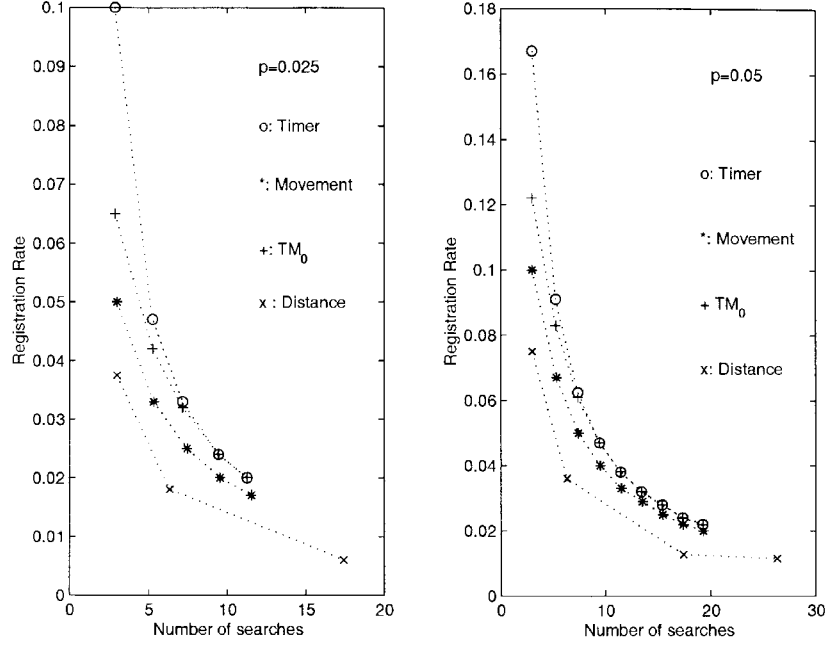

Figure 3: Registration rate as a function of the expected number of searches, under sequential paging.

- The sequential search described in Section 3. This search is efficient in the sense that the average number of locations searched is relatively small. However, the paging delay is relatively large.

- A one-phase paging: Under this paging strategy the search is conducted simultaneously at all possible candidates for the user location.

Figure 3 depicts the expected registration rate (measured in number of registrations per time unit) as a function of the expected number of searches for the timer-based, movement-based, $TM_0$, and the distance-based strategies, under sequential paging, for $p = 0.025$ and $p = 0.05$. It can be seen that all CIC-based strategies outperform the timer based method, in the sense that for the same expected number of searches required to find the user, the expected registration rate is significantly smaller than the one required by the timer-based method. The best performance is achieved by the distance based strategy. Note that for very low registration rates (implying high paging cost) the performance difference between the movement-based, timer-based, and the $TM_0$ strategies is negligible. This result

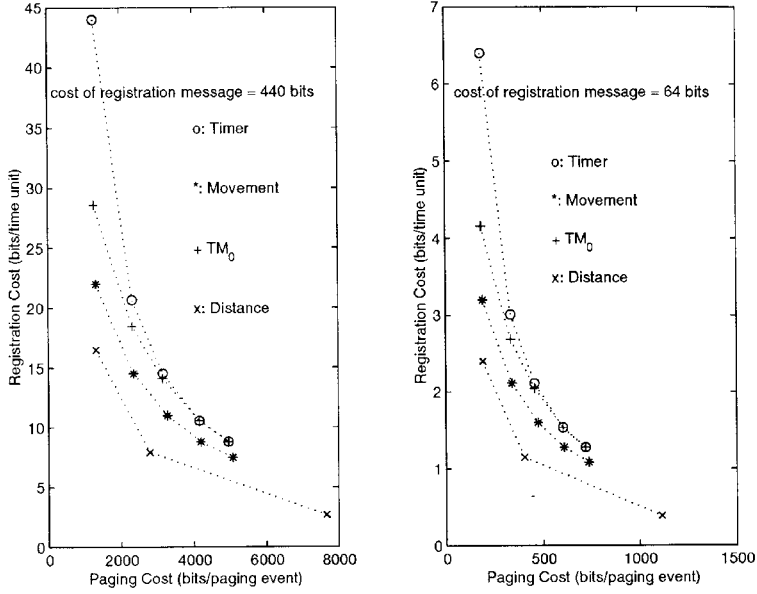

Figure 4: The total Registration cost as a function of the paging cost, under sequential paging, for CIC transmission rate of 5 messages per time unit.

is in agreement with the result obtained in [3] for a one dimensional model.

To compare the *overall* performance of the tracking strategies, the CIC transmission cost must be taken into account. Figure 4 depicts the *total* registration cost, defined as the sum of the registration cost and the CIC transmission cost, as a function of the paging cost, for CIC transmission rate of 5 messages per time unit, $p = 0.025$, and user density $\rho = 1200$ users per cell. The cost of a single paging is considered equal to the cost of a single registration message, $l_p = l_r = 440$ bits and $l_p = l_r = 64$ bits. The CIC-based strategies outperform the timer-based strategy. The best performance is achieved by the distance-based strategy, even-though its CIC transmission cost is the maximal. Note that the minimal cost of registration in the GSM system is 440 bits [5], for the situation where the VLR at the time of registration is the last known VLR.

Figure 5 depicts the registration rate as a function of the expected number of searches, for one-phase paging, subject to the constraint that the maximal paging delay is one. It can be seen that the CIC-based strategies outperform the timer-based method even better than under sequential paging.

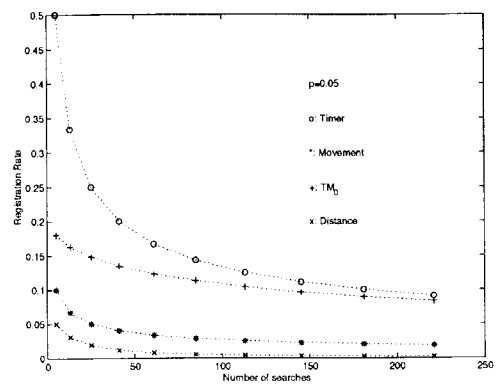
Figure 5: Registration rate as a function of the number of searches, under single phase search, for p=0.05.

where $l_r$ is the cost of a single registration, measured in number of bits. For $D \gg 1$, $\pi_{D-1}^2 \ll \pi_{D-1}^1$, and we can approximate: $R_D \approx 2p\pi_{D-1}l_r$. The CIC transmission cost is four bits transmitted by each cell, every $T_1$ time units. The cost per user is therefore:

$$T_D = \frac{4}{T_1 \rho}, \tag{14}$$

where $\rho = \frac{n}{N}$ is the number of users per cell.

3.2 Performance of the movement based strategy

Since user movements are allowed only in horizontal or vertical direction, only one bit is needed to detect a cell boundary crossing. Hence, the CIC transmission cost (per user) is given by:

$$T_M = \frac{1}{T_1 \rho}. \tag{15}$$

Since the probability of cell boundary crossing is $4p$ for each time slot, it takes on average $M/4p$ time slots to complete $M$ movements. The expected registration cost is therefore:

$$R_M = \left\lfloor \frac{4p}{M} \right\rfloor l_r. \tag{16}$$

Since calls are initiated by the users as a Poisson process, the PASTA (Poisson Arrival See Time Average) property implies that the probability that a paging event will occur after the user has made $k$ movements since its last registration message is uniformly distributed over $[0, M-1]$. The expected paging cost is therefore given by:

$$P_M = \frac{l_p}{M} \sum_{k=0}^{M-1} \sum_{d=0}^{k} Pr[distance = d| movements = k][1 + 2d(d+1)] \tag{17}$$

In order to obtain the value of $Pr[distance = d| movements = k]$ we first consider the one dimensional case: Given that the user made $k$ movements, the probability that it travels a distance $d$ is given by the sum of all probabilities to have $d + (k-d)/2$ movements in one direction, and $(k-d)/2$ movements along the opposite direction. Hence, for the one dimensional case we get:

$$Pr[distance = d|movements = k] = \frac{1}{2^k} \begin{cases} 2\binom{k}{\frac{k-d}{2}} & \text{, for } 0 < d \leq k, \ k-d \text{ even} \\ \binom{k}{\frac{k}{2}} & \text{, for } d = 0, \ k \text{ even} \\ 0 & \text{Otherwise} \end{cases} \tag{18}$$

The factor 2 in Equation 18 results from the fact that for $d > 0$ the user can move either to the right or to the left. For the two dimensional case, given that the user made $k$ movements, the probability to travel a distance $d$ is the sum of all probabilities to travel a distance $d_x$ along the horizontal axis ($0 \leq d_x \leq d$) by making $k_x$ movements along the horizontal axis ($d_x \leq k_x \leq k$) and travel a distance $d_y = d - d_x$ by making $k - k_x$ movements along the vertical axis. Given $d_x, k_x, k, d$, the number of all possible paths is:

$$\alpha(k_x, d_x, k, d) = \begin{cases} \delta_x \delta_y \binom{k_x}{\frac{k_x - d_x}{2}} \binom{k - k_x}{\frac{(k-k_x)-(d-d_x)}{2}} & \text{, for } k_x - d_x \text{ even, } k - d \text{ even} \\ 0 & \text{Otherwise} \end{cases} \quad (19)$$

Where $\delta_x, \delta_y = 2$ if $d_x, d_y > 0$, respectively, and $\delta_x, \delta_y = 1$ if $d_x, d_y = 0$, respectively. Hence:

$$Pr[distance = d | movements = k] = \frac{1}{4^k} \sum_{k_x=0}^{k} \binom{k}{k_x} \sum_{d_x=max\{0,d-(k-k_x)\}}^{min\{k_x,d\}} \alpha(k_x, d_x, k, d). \quad (20)$$

Substituting Equation 20 in Equation 17, we get the expected paging cost under the movement based strategy.

3.3 Performance of the timer based strategy

The timer based strategy requires no location information. Hence, its CIC transmission cost is zero. The registration cost is simply:

$$R_T = \frac{l_r}{T}, \quad (21)$$

where $T$ is the timer used. Using a similar reasoning to that used for the movements based method, the probability that a paging event will occur $t$ time units after the user last registration message is uniformly distributed over $[0, T-1]$. The expected paging cost is therefore:

$$P_T = \frac{l_p}{T} \sum_{t=0}^{T-1} \sum_{k=0}^{t} Pr[movements = k | time = t] \sum_{d=0}^{k} Pr[distance = d | movements = k][1 + 2d(d+1)]. \quad (22)$$

Since the last term is given in Equation 20, what remains to be computed is the probability that the user has made $k$ movements during $t$ time units:

$$Pr[movements = k | time = t] = \binom{t}{k}(4p)^k(1-4p)^{t-k}, \quad 0 \leq k \leq t \quad (23)$$

Substituting of Equations 23 and 20 in Equation 22 yields the expected paging cost.

3.4 The timer/movement ($TM$) strategy

Under the $TM$ strategy the user counts the number of cell transitions. The CIC transmission cost is therefore equal to that of the movement based strategy:

$$T_{TM} = \frac{1}{T_1 \rho}. \tag{24}$$

Consider the special case of the $TM$ method where $k = 0$. Under this strategy, denoted $TM_0$, the user transmits a registration message every $T$ time units, provided that it made at least one movement since its last location update. Hence, the registration rate is given by:

$$R_{TM_0} = l_r \left[ \frac{1 - q^T}{T} \right]. \tag{25}$$

Comparing to the timer based method, the registration rate reduces, since users who have not moved do not register:

$$R_T - R_{TM_0} = l_r \left[ \frac{q^T}{T} \right]. \tag{26}$$

Since under both strategies a user who changed its location since its last location update transmits a registration message, the paging cost under both strategies is the same:

$$P_{TM_0} = P_T \tag{27}$$

Hence, the condition under which the $TM_0$ strategy outperforms the timer based strategy is:

$$q^T > \frac{T}{T_1 l_r \rho}. \tag{28}$$

Consider, for example the numerical example given in Section 2.3, where $\rho = 1200$ users per cell, $l_r = 440$ bits, $T = 10$ minutes and $T_1 = 1$ second. We get that the $TM_0$ strategy outperforms the timer based strategy whenever: $q^T > 0.0011$. Namely, if at least 0.11% of the users do not move from their location during 10 minutes.

3.4.1 A comparison of the $TM$ strategy to the conditional timer ($CT$) strategy Under both strategies a user who has changed its location during $T$ time units since its last location update transmits a registration message. Hence, the paging cost under both strategies is the same.

The registration cost under the $TM_0$ strategy is higher than that of the $CT$ strategy, since there is a probability that during $T$ time units a user has moved in and out from its last known location. The difference is given by:

$$R_{TM_0} - R_{CT} = \frac{\beta(T)l_r}{T}, \tag{29}$$

where $\beta(T) = Pr[movements > 0|time = T]Pr[distance = 0|movements > 0]$.

On the other hand, the CIC transmission cost of the $TM_0$ strategy is much lower than that of the $CT$ strategy:

$$T_{CT} - T_{TM_0} = \frac{\log_2 N - 1}{T_1 \rho} = \frac{\log_2 [N/2]}{T_1 \rho}. \tag{30}$$

Using Equations 23, and applying Equation 18 on both dimensions, we get that:

$$\beta(T) = \sum_{k=1}^{\lfloor T/2 \rfloor} Pr[movements = 2k|time = T]Pr[distance = 0|movements = 2k] =$$

$$\sum_{k=1}^{\lfloor T/2 \rfloor} \binom{T}{2k}(4p)^{2k}(1-4p)^{T-2k}\frac{1}{4^{2k}}\sum_{i=0}^{k}\binom{2i}{i}\binom{2(k-i)}{k-i}. \tag{31}$$

Hence, the condition under which the $TM_0$ strategy outperforms the $CT$ strategy is:

$$\beta(T) = \sum_{k=1}^{\lfloor T/2 \rfloor} \binom{T}{2k}(4p)^{2k}(1-4p)^{T-2k}\frac{1}{4^{2k}}\sum_{i=0}^{k}\binom{2i}{i}\binom{2(k-i)}{k-i} < \frac{\log_2 [N/2]}{T_1 \rho}. \tag{32}$$

Since a situation where a user has moved in and out from its location during a short time period is very rare in practice, it is expected that for most practical cases the $TM_0$ strategy would outperform the $CT$ strategy, specially for large networks, where $\log_2 N$ is relatively high.

4 Comparison of the strategies and numerical results

To compare the performance of the tracking strategies discussed we evaluate the tracking cost under two search strategies, representing two extreme paging delay constraints:

3 Performance Analysis

Below we evaluate the tracking cost of the CIC based strategies and compare it to that of the timer based method, adopted by the IS-41 standard. To model user movement in the network we assume that time is slotted and that a user can make at most one move during a single time slot. The movements are stochastic and independent from one user to another. We assume that calls are initiated by the users as a Poisson process, and that the size of a time slot is sufficiently small such that we can neglect the probability of arrival of more than one call in a single time slot. For each user, the probability of a call arrival during each time slot is denoted by $\lambda$. We consider an infinite two-dimensional system with grid topology. The user motion model is assumed to be independent and identically distributed (i.i.d. model): A user residing at cell (i,j) can move to cells (i+1,j), (i−1,j), (i,j+1), and (i,j−1) with probability p to each one of them, or to remain at cell (i,j) with probability q=(1−4p). The distance d between two cells, in terms of number of cells, is measured using the city block metric, also known as the Manhattan metric:

$$\text{distance}((i_1,j_1),(i_2,j_2)) = |i_1-i_2| + |j_1-j_2|. \quad (4)$$

The paging strategy is the following: The user is first searched at its last known location, say (x,y). If it is not found there, then it is searched sequentially in increasing distance order from (x,y); The search is conducted simultaneously at all the cells in a distance d from (x,y), d=1,2,3 . . . , until the user is found.

The comparison between the different strategies is done by evaluating the expected paging cost, denoted $P_s$, the expected registration cost, denoted $R_s$, and the CIC transmission cost, denoted $T_s$, where s is the strategy used. The tracking cost is given by $P_s+R_s+T_s$. Since user movements are stochastic and independent from one user to another, it suffices to calculate the tracking cost for one user (arbitrarily chosen). We compare between the distance-based strategy, the movement-based strategy, the TM strategy, and the timer-based method (adopted by the IS-41 standard).

3.1 Performance of the Distance Based Strategy

Let $(x_0,Y_0)$ be the user last known location, at time t=0. The group of all locations at a distance less than or equal to D is a rhombus centered at $(x_0,y_0)$, with side length $\sqrt{2}D$. The layer l(d) is defined as the group of all locations at a distance d from $(x_0,y_0)$. There are exactly 4d locations in l(d). Hence, the maximal number of all possible locations is given by:

$$1 + \sum_{d=1}^{D-1} l(d) = 1 + 2D(D-1). \quad (5)$$

What is claimed is:

1. In a system, including at least one location area, each of the at least one location area including a plurality of cells, each cell having a certain size, wherein at least one user moves among the cells of the at least one location area, and wherein, for each cell, a location area code, representative of the location area wherein the each cell is included, is transmitted to each of the at least one user located within the each cell, a method for tracking the at least one user, comprising the steps of:

(a) assigning a cell identity to each cell by steps including:
  (i) superposing a grid on the cells, said grid including a plurality of tiles, each said tile having a tile identity, all of said tiles having a common size, the size of each cell being at most said common size of said tiles;
  (ii) matching each cell to a corresponding said tile; and
  (iii) for each cell, assigning said tile identity of said corresponding tile to said each cell as said cell identity of said each cell;

(b) for each cell, broadcasting a cell code representative of said cell identity of said each cell to each of said at least one user located within said each cell;

(c) for each at least one user, receiving both the location area code and said cell code transmitted for the each cell wherein said each at least one user is located; and (d) for each at least one user, transmitting a registration message, said transmitting being based both on said location area code received by said at least one user and on said cell code received by said each at least one user.

2. The method of claim 1, wherein a different said grid is superposed on the cells of each at least one location area.

3. The method of claim 2, further comprising the step of:
(e) for each at least one user, subsequent to each said transmitting of said registration message, computing a distance traveled by said each at least one user, said distance being based on said cell codes received by said each at least one user, a next said transmitting of said registration message being effected when said distance exceeds a threshold.

4. The method of claim 1, wherein neighboring cells have different said cell identities.

5. The method of claim 4, further comprising the step of:
(e) for each at least one user, subsequent to each said transmitting of said registration message, counting a number of times that said cell code received by said each at least one user changes, a next said transmitting of said registration message being effected when said number exceeds a cell transit number threshold.

6. The method of claim 5, wherein said next said transmitting of said registration message is effected only if a time since said each transmitting of said registration message exceeds a time threshold.

7. The method of claim 1, wherein said identity of said each cell is unique.

8. The method of claim 7, wherein, for each at least one user, subsequent to each said transmitting of said registration message, a next said transmitting of said registration message is effected only if:
(i) a time since said each transmitting of said registration message exceeds a threshold; and
(ii) said cell code, whereon said registration message is based, differs from said cell code whereon said registration message of said each transmitting was based.

9. The method of claim 8, further comprising the step of:
(e) for each at least one user, identifying at least one of the cells as a low residence time cell, said transmitting of said registration message being effected only if said each at least one user is located in one of said at least one low residence time cells.

10. In a system, including at least one location area, each of the at least one location area including a plurality of cells, each cell having a certain size, wherein at least one user moves among the cells of the at least one location area, and wherein, for each cell, a location area code, representative of the location area wherein the each cell is included, is transmitted to each of the at least one user located within the each cell, a method for tracking the at least one user, comprising the steps of:

(a) assigning a cell identity to each cell, at least two of said cells of one of said at least one location area having identical said cell identities;

(b) for each cell, broadcasting a cell code representative of said cell identity of said each cell to each of said at least one user located within said each cell;

(c) for each at least one user, receiving both the location area code and said cell code transmitted for the each cell wherein said each at least one user is located; and (d) for each at least one user, transmitting a registration message, said transmitting being based both on said location area code received by said at least one user and on said cell code received by said each at least one user.

11. The method of claim 10, wherein each said cell code includes at most four bits.

12. The method of claim 10, wherein, for each said at least two cells that have identical cell identities, at least one other cell intervenes between any two of said each at least two cells.

13. In a system, including at least one location area, each of the at least one location area including a plurality of cells, each cell having a certain size, wherein at least one user moves among the cells of the at least one location area, and wherein, for each cell, a location area code, representative of the location area wherein the each cell is included, is transmitted to each of the at least one user located within the each cell, a method for tracking the at least one user, comprising the steps of:

(a) assigning a cell identity to each cell, with neighboring cells having different said cell identities;

(b) for each cell, broadcasting a cell code representative of said cell identity of said each cell to each of said at least one user located within said each cell;

(c) for each at least one user, receiving both the location area code and said cell code transmitted for the each cell wherein said each at least one user is located; and (d) for each at least one user, transmitting a registration message, said transmitting being based both on said location area code received by said at least one user and on said cell code received by said each at least one user; and (e) for each at least one user, subsequent to each said transmitting of said registration message, counting a number of times that said cell code received by said each at least one user changes, a next said transmitting of said registration message being effected when said number exceeds a cell transit number threshold.

14. The method of claim 13, wherein said next said transmitting of said registration message is effected only if a time since said each transmitting of said registration message exceeds a time threshold.

15. In a system, including at least one location area, each of the at least one location area including a plurality of cells, each cell having a certain size, wherein at least one user moves among the cells of the at least one location area, and wherein, for each cell, a location area code, representative of the location area wherein the each cell is included, is transmitted to each of the at least one user located within the each cell, a method for tracking the at least one user, comprising the steps of:

(a) assigning a unique cell identity to each cell;

(b) for each cell, broadcasting a cell code representative of said cell identity of said each cell to each of said at least one user located within said each cell;

(c) for each at least one user, receiving both the location area code and said cell code transmitted for the each cell wherein said each at least one user is located; and (d) for each at least one user, transmitting a registration message, said transmitting being based both on said location area code received by said at least one user and on said cell code received by said each at least one user;

wherein, for each at least one user, subsequent to each said transmitting of said registration message, a next said transmitting of said registration message is effected only if:

(i) a time since said each transmitting of said registration message exceeds a threshold; and (ii) said cell code, whereon said registration message is based, differs from said cell code whereon said registration message of said each transmitting was based.

16. The method of claim 15, further comprising the step of:

(e) for each at least one user, identifying at least one of the cells as a low residence time cell, said transmitting of said registration message being effected only if said each at least one user is located in one of said at least one low residence time cells.

17. In a system, including at least one location area, each of the at least one location area including a plurality of cells, each cell having a certain size, wherein at least one user moves among the cells of the at least one location area, and wherein, for each cell, a location area code, representative of the location area wherein the each cell is included, is transmitted to each of the at least one user located within the each cell, a method for tracking the at least one user, comprising the steps of:

(a) assigning a cell identity to each cell by steps including:

(i) superposing a grid on the cells, said grid including a plurality of tiles, each said tile having a tile identity;

(ii) matching each cell to a corresponding said tile; and (iii) for each cell, assigning said tile identity of said corresponding tile to said each cell as said cell identity of said each cell;

(b) for each cell, broadcasting a cell code representative of said cell identity of said each cell to each of said at least one user located within said each cell;

(c) for each at least one user, receiving both the location area code and said cell code transmitted for the each cell wherein said each at least one user is located; and (d) for each at least one user, transmitting a registration message, said transmitting being based both on said location area code received by said at least one user and on said cell code received by said each at least one user; and (e) for each at least one user, subsequent to each said transmitting of said registration message, computing a distance traveled by said each at past one user, said distance being based on said cell codes received by saiLeach at least one user, a next said transmitting of said registration messagl being effected when said distance exceeds a threshold.

18. In a system, including at least one location area, each of the at least one location area including a plurality of cells, each cell having a certain size, wherein at least one user moves among the cells of the at least one location area, and wherein, for each cell, a location area code, representative of the location area wherein the each cell is included, is transmitted to each of the at least one user located within the each cell, a method for tracking the at least one user, comprising the steps of:

(a) assigning a cell identity to each cell by steps including:

(i) superposing a grid on the cells, said grid including a plurality of tiles, each said tile having a tile identity;

(ii) matching each cell to a corresponding said tile; and (iii) for each cell, assigning said tile identity of said corresponding tile to said each cell as said cell identity of said each cell, with neighboring cells having different said cell identities;

(b) for each cell, broadcasting a cell code representative of said cell identity of said each cell to each of said at least one user located within said each cell;

(c) for each at least one user, receiving both the location area code and said cell code transmitted for the each cell wherein said each at least one user is located; and (d) for each at least one user, transmitting a registration message, said transmitting being based both on said location area code received by said at least one user and on said cell code received by said each at least one user; and (e) for each at least one user, subsequent to each said transmitting of said registration message, counting a number of times that said cell code received by said each at least one user changes, a next said transmitting of said registration message being effected when said number exceeds a cell transit number threshold.

19. In a system, including at least one location area, each of the at least one location area including a plurality of cells, each cell having a certain size, wherein at least one user moves among the cells of the at least one location area, and wherein, for each cell, a location area code, representative of the location area wherein the each cell is included, is transmitted to each of the at least one user located within the each cell, a method for tracking the at least one user, comprising the steps of:

(a) assigning a unique cell identity to each cell by steps including:
   (i) superposing a grid on the cells, said grid including a plurality of tiles, each said tile having a tile identity;
   (ii) matching each cell to a corresponding said tile; and
   (iii) for each cell, assigning said tile identity of said corresponding tile to said each cell as said cell identity of said each cell;

(b) for each cell, broadcasting a cell code representative of said cell identity of said each cell to each of said at least one user located within said each cell;

(c) for each at least one user, receiving both the location area code and said cell code transmitted for the each cell wherein said each at least one user is located; and (d) for each at least one user, transmitting a registration message, said transmitting being based both on said location area code received by said at least one user and on said cell code received by said each at least one user;

and wherein, for each at least one user, subsequent to each said transmitting of said registration message, a next said transmitting of said registration message is effected only if:

(i) a time since said each transmitting of said registration message exceeds a threshold; and (ii) said cell code, whereon said registration message is based, differs from said cell code whereon said registration message of said each transmitting was based.

* * * * *